US010814729B2

(12) United States Patent
Long et al.

(10) Patent No.: US 10,814,729 B2
(45) Date of Patent: *Oct. 27, 2020

(54) METHOD AND APPARATUS FOR THE ALIGNMENT OF A VEHICLE AND CHARGING COIL PRIOR TO WIRELESS CHARGING

(71) Applicants: Momentum Dynamics Corporation, Malvern, PA (US); Ghayda Al Ali

(72) Inventors: Bruce Richard Long, Malvern, PA (US); Andrew W. Daga, Malvern, PA (US); Francis J. McMahon, Malvern, PA (US)

(73) Assignee: Momentum Dynamics Corporation, Malvern, PA (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/030,036

(22) Filed: Jul. 9, 2018

(65) Prior Publication Data

US 2018/0312071 A1 Nov. 1, 2018

Related U.S. Application Data

(63) Continuation-in-part of application No. 14/541,563, filed on Nov. 14, 2014, now Pat. No. 10,040,360.
(Continued)

(51) Int. Cl.
*B60L 53/36* (2019.01)
*B60L 11/18* (2006.01)
(Continued)

(52) U.S. Cl.
CPC .......... *B60L 11/1833* (2013.01); *B60L 53/12* (2019.02); *B60L 53/36* (2019.02); *B60L 53/39* (2019.02);
(Continued)

(58) Field of Classification Search
CPC ...... B60L 11/1833; B60L 53/12; B60L 53/36; B60L 53/39; H02J 50/90; H02J 50/12;
(Continued)

(56) References Cited

U.S. PATENT DOCUMENTS

| 4,219,821 A | 8/1980 | Selim |
| 9,882,416 B2 | 1/2018 | Amari |

(Continued)

FOREIGN PATENT DOCUMENTS

| CN | 106981215 | | 7/2017 |
| CN | 106981215 A | * | 7/2017 |
| WO | WO-2020013989 A1 | | 1/2020 |

OTHER PUBLICATIONS

"U.S. Appl. No. 14/541,563, Response filed Dec. 8, 2016 to Non Final Office Action dated Aug. 8, 2016", 10 pgs.
(Continued)

*Primary Examiner* — Richard Isla
*Assistant Examiner* — Manuel Hernandez
(74) *Attorney, Agent, or Firm* — Schwegman Lundberg & Woessner, P.A.

(57) ABSTRACT

A vehicle alignment system is adapted to align a vehicle with a wireless power induction coil for wireless charging through use of magnetic resonant induction. The system includes a transmission line disposed in the parking slot so as to guide the vehicle to the wireless power induction coil for charging. The transmission line leaks a signal having an operating frequency that is detected to align the vehicle left-right in the parking slot when the vehicle is aligned for charging by the wireless power induction coil. At least two vehicle mounted antennas mounted on opposite sides of transmission line when the vehicle is aligned in the parking slot detect the operating frequency from the transmission line, and signal processing circuitry detects a relative signal
(Continued)

phase between signals detected by the antennas. The relative phase differences between the detected signals from the antennas are representative of alignment of the vehicle with respect to the wireless power induction coil and the parking slot.

21 Claims, 8 Drawing Sheets

Related U.S. Application Data

(60) Provisional application No. 61/904,175, filed on Nov. 14, 2013.

(51) Int. Cl.
  *B62D 15/02* (2006.01)
  *H04B 5/00* (2006.01)
  *H02J 50/12* (2016.01)
  *B60L 53/39* (2019.01)
  *H02J 50/90* (2016.01)
  *B60L 53/12* (2019.01)

(52) U.S. Cl.
  CPC ....... *B62D 15/028* (2013.01); *B62D 15/0285* (2013.01); *H02J 50/12* (2016.02); *H02J 50/90* (2016.02); *H04B 5/0018* (2013.01); *H04B 5/0075* (2013.01); *H04B 5/0081* (2013.01)

(58) Field of Classification Search
  CPC ............... H02J 2310/48; B62D 15/028; B62D 15/0285; H04B 5/0018; H04B 5/0075; H04B 5/0081
  USPC .......................................... 320/108; 307/104
  See application file for complete search history.

(56) References Cited

U.S. PATENT DOCUMENTS

| | | | |
|---|---|---|---|
| 2006/0136109 A1* | 6/2006 | Tanaka | B60W 40/04 701/41 |
| 2008/0265684 A1* | 10/2008 | Farkas | B60L 58/40 307/104 |
| 2011/0114401 A1 | 5/2011 | Kanno | |
| 2012/0262002 A1 | 10/2012 | Widmer et al. | |
| 2013/0270921 A1 | 10/2013 | Boys et al. | |
| 2014/0125140 A1 | 5/2014 | Widmer et al. | |
| 2014/0183966 A1 | 7/2014 | Suzuki et al. | |
| 2014/0217966 A1 | 8/2014 | Schneider et al. | |
| 2015/0094887 A1 | 4/2015 | Kawashima | |
| 2015/0236513 A1 | 8/2015 | Covic et al. | |
| 2015/0260835 A1 | 9/2015 | Widmer et al. | |
| 2016/0025821 A1 | 1/2016 | Widmer et al. | |
| 2016/0318413 A1 | 11/2016 | Roehrl et al. | |
| 2017/0136880 A1 | 5/2017 | Ricci | |
| 2017/0274787 A1 | 9/2017 | Salter et al. | |
| 2017/0313202 A1 | 11/2017 | Amari | |
| 2018/0111492 A1 | 4/2018 | Mccool et al. | |
| 2020/0039371 A1* | 2/2020 | Herzog | H02J 7/025 |
| 2020/0127506 A1 | 4/2020 | Mcmahon et al. | |

OTHER PUBLICATIONS

"U.S. Appl. No. 14/541,563, Response filed Jul. 20, 2017 to Non Final Office Action dated Apr. 20, 2017", 11 pgs.
"U.S. Appl. No. 14/541,563, Examiner Interview Summary dated Jan. 18, 2018", 2 pgs.
"U.S. Appl. No. 14/541,563, Final Office Action dated Nov. 2, 2017", 18 pgs.
"U.S. Appl. No. 14/541,563, Non Final Office Action dated Apr. 20, 2017", 30 pgs.
"U.S. Appl. No. 14/541,563, Non Final Office Action dated Aug. 8, 2016", 22 pgs.
"U.S. Appl. No. 14/541,563, Notice of Allowance dated Apr. 3, 2018".
"U.S. Appl. No. 14/541,563, Response filed Jan. 12, 2018 to Final Office Action dated Nov. 2, 2017", 11 pgs.
"International Application Serial No. PCT US2019 039161, International Search Report dated Sep. 24, 2019", 2 pgs.
"International Application Serial No. PCT US2019 039161, Written Opinion dated Sep. 24, 2019", 6 pgs.

* cited by examiner

METHOD AND APPARATUS FOR THE ALIGNMENT OF A VEHICLE AND CHARGING COIL PRIOR TO WIRELESS CHARGING

CROSS-REFERENCE TO RELATED APPLICATIONS

This continuation-in-part application claims priority to U.S. patent application Ser. No. 14/541,563, filed Nov. 14, 2014, which, in turn, claims priority to U.S. Provisional Patent Application No. 61/904,175, filed Nov. 14, 2013, the disclosures of which are incorporated herein by reference in their entireties.

TECHNICAL FIELD

This patent application describes a vehicle alignment system as it pertains to wireless charging through use of magnetic resonant induction.

BACKGROUND

Resonant induction wireless charging makes use of an air core transformer consisting of two concentric coils displaced along a common coil axis. Transformer coupling coefficient and wireless power transfer efficiency is degraded if the primary and secondary coils are not axially aligned. For vehicle wireless charging this means some provision must be made so that the vehicle parking position is precise and repeatable in order to ensure coil axial alignment.

SUMMARY

A vehicle alignment system aligns a vehicle with a wireless power induction coil for wireless charging through use of magnetic resonant induction. The system includes a transmission line leaking a signal having an operating frequency and that is disposed in a parking slot containing the wireless power induction coil. The transmission line guides the vehicle to the wireless power induction coil for charging. At least two vehicle mounted antennas mounted on respective sides of, and preferably symmetrically with respect to, the transmission line when the vehicle is aligned in the parking slot detect the signal that leaks from the transmission line. Signal processing circuitry detects a relative signal phase between the signals received by the antennas on opposite sides of the transmission line. The relative phase differences between the detected signals from the antennas are representative of alignment of the vehicle left-right with respect to the transmission line.

In sample embodiments, the transmission line leaks a signal at an operating frequency and is disposed along or parallel to but offset from a centerline of the parking slot or is curved along a trajectory to guide the vehicle to the wireless power induction coil in the parking slot. The transmission line may comprise a 300 ohm characteristic impedance transmission line or a 50 or 75 ohm coaxial cable with slots in outer shielding of the coaxial cable and a termination resistor that is matched to a characteristic impedance of the coaxial cable. In sample embodiments, the signal processing circuitry includes a frequency modulation receiver for detection of relative phase differences between the signals detected by the respective antennas as determined by vehicle parking slot alignment, where the phase differences are induced by sequential switching when the antennas are not an equal distance from the transmission line. The signal processing circuitry may also include an antenna switch that switches between two or more vehicle mounted antennas. The signal processing circuitry may further include a synchronous detector responsive to antenna switching frequency components present in the output of the frequency modulation receiver, a voltage comparator that determines alignment error polarity from an output of the synchronous detector, and an absolute value circuit that determines alignment error magnitude from the output of the synchronous detector. The system may also include visible, audible, or tactile means for directing the driver to adjust the alignment of the vehicle in response to the alignment error polarity and the alignment error magnitude. In a sample embodiment, the operating frequency is the 40.68 MHz or the 13.56 MHz ISM frequency, although frequencies up to 61.5 MHz or more may be used depending upon the dimensions of the parking space and the spacing of the antennas on the vehicle.

A method is also provided for aligning a vehicle with a wireless power induction coil for wireless charging through use of magnetic resonant induction. A transmission line disposed in the parking slot leaks a signal having an operating frequency and is disposed in the parking slot so as to guide the vehicle to the wireless power induction coil for charging. The vehicle is aligned left-right in the parking slot relative to the transmission line using at least two vehicle mounted antennas mounted on opposite sides the transmission line when the vehicle is aligned in the parking slot. The antennas detect the signal having the operating frequency that leaks from the transmission line and alignment of the vehicle is adjusted relative to the wireless power induction coil based on relative phase differences between the detected signals from the antennas as representative of alignment of the vehicle with respect to the transmission line.

The method may also include switching between two or more vehicle-mounted antennas and detecting relative phase differences between the signals detected by the respective antennas wherein the phase differences are induced by sequential switching when the antennas are not an equal distance from the transmission line. The sequential switching includes a synchronous detector responsive to antenna switching frequency components present in the output of the frequency modulation receiver switching between the antennas, a voltage comparator determining alignment error polarity from an output of the synchronous detector, and an absolute value circuit determining alignment error magnitude from the output of the synchronous detector. The adjusting step may also comprise directing the driver to adjust the alignment of the vehicle in response to the alignment error polarity and the alignment error magnitude using visible, audible, or tactile means.

BRIEF DESCRIPTION OF THE DRAWINGS

The foregoing and other beneficial features and advantages of the systems and methods described herein will become apparent from the following detailed description in connection with the attached figures, of which.

DETAILED DESCRIPTION OF ILLUSTRATIVE EMBODIMENTS

The inventive systems and methods may be understood more readily by reference to the following detailed description taken in connection with the accompanying figures and examples, which form a part of this disclosure. It is to be understood that systems and methods are not limited to the specific products, methods, conditions or parameters described and/or shown
herein, and that the terminology used herein is for the purpose of describing particular embodiments by way of example only and is not intended to be limiting. Similarly, any description as to a possible mechanism or mode of action or reason for improvement is meant to be illustrative only, and the systems and methods described herein are not to be constrained by the correctness or incorrectness of any such suggested mechanism or mode of action or reason for improvement. Throughout this text, it is recognized that the descriptions refer both to methods and software for implementing such methods.

A detailed description of illustrative embodiments will now be described with reference to FIGS. 1-5. Although this description provides a detailed example of possible implementations of the systems and methods described herein, it should be noted that these details are intended to be by way of example only and in no way delimit the scope of the claimed subject matter.

Figure 1A:
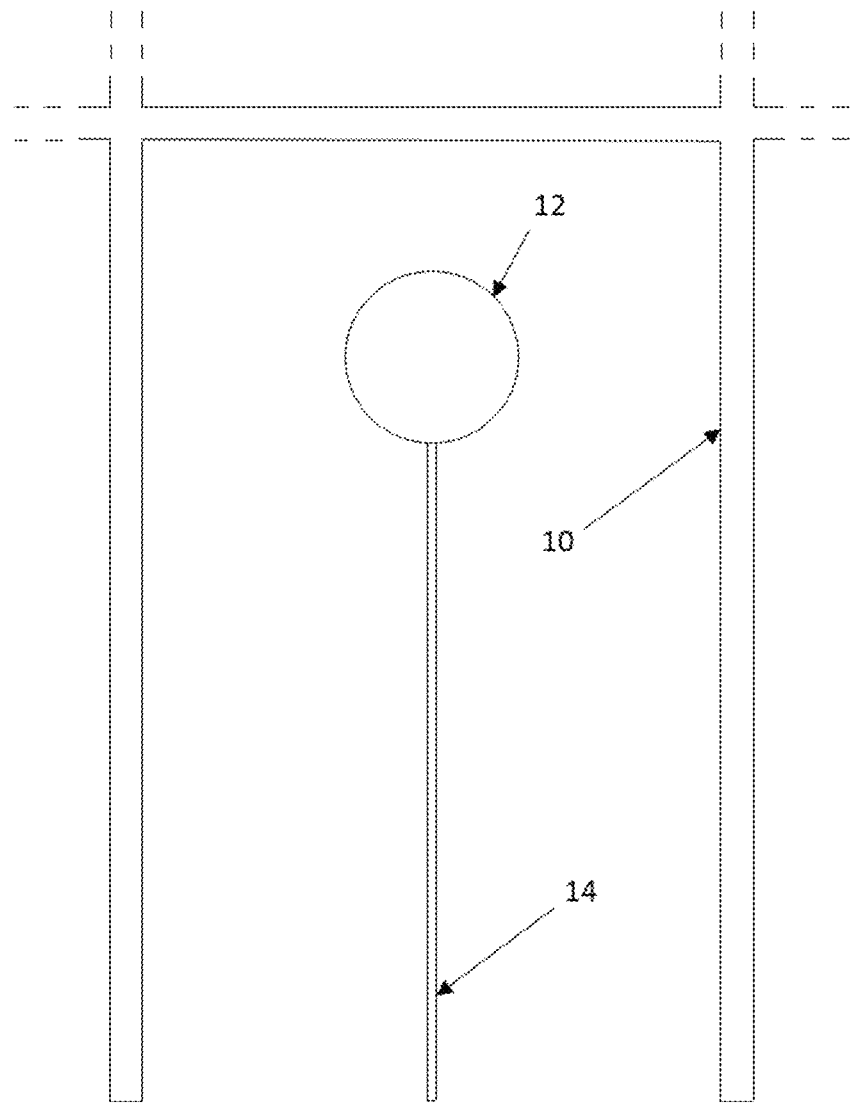
FIG. 1a shows a representation of a vehicle parking slot with an induction wireless power sending coil and an alignment system including a transmission line coincident with the parking slot center line.

FIG. 1a is a schematic representation of an automotive parking slot 10. The wireless power transfer primary coil 12 is shown near the head of the parking slot 10, although the wireless power transfer primary coil 12 could also be located at the foot of the parking slot 10 or elsewhere within the parking slot boundaries. No matter what the primary coil location, the vehicle must be parked within the indicated boundaries of the parking slot 10. A buried or surface mounted transmission line 14 extends along the parking slot centerline. This transmission line 14, connected to a low power continuous wave radio frequency source 20 (FIG. 2), creates a localized radio frequency field used by the vehicle mounted electronics to determine vehicle alignment within the perimeter of the parking slot 10. The transmission line 14 can vary in length and orientation from the short and straight embodiment shown in FIG. 1a or longer and curved as shown in FIGS. 1b and 1c.

Figure 1B:
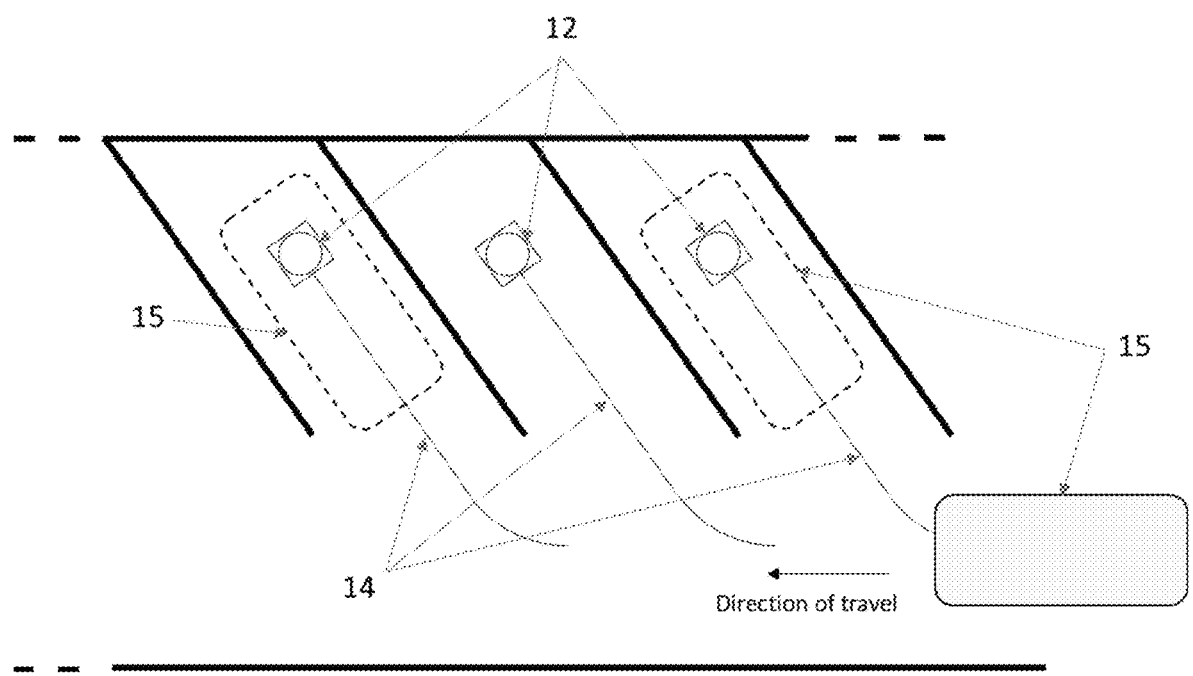
FIG. 1b shows a representation of a vehicle parking lot with angled parking slots, induction wireless power sending coils, and an alignment system that includes curved transmission lines that assist in guiding a vehicle to the proper location within the parking slot for charging.

FIG. 1b is a representation of a series of angled parking slots 10. The wireless power transfer primary coil 12 is shown in each of the angled parking slots 10 near the head-end. A buried or surface mount transmission line 14 runs within the parking slot along the centerline and extends out of the parking slot, curving into the lane of vehicle travel along a trajectory to guide the vehicle to the wireless power induction coil 12 in the parking slot 10. A vehicle 15 travels in a direction from right to left and receives the alignment signal from the transmission line and a low power continuous wave radio frequency source 20 (FIG. 2) for the appropriate slot where a charging primary coil 12 is available. The vehicle 15 uses the alignment signal from the transmission line 14 in conjunction with receive antennas on the vehicle 15 as described below with respect to FIG. 2.

Figure 1C:
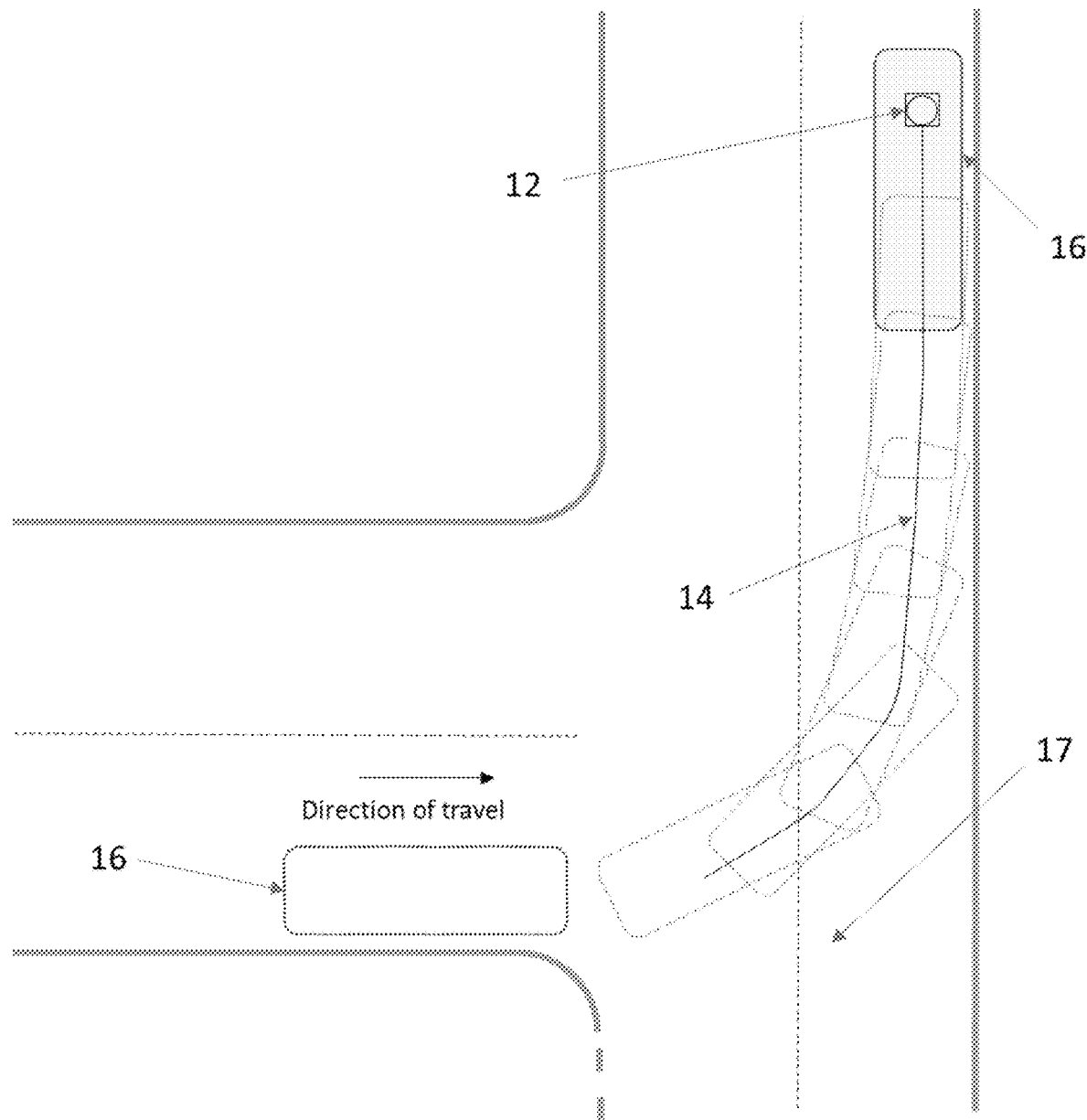
FIG. 1c shows a representation of a bus approaching an inductive charging location after a turn whereby a long curved transmission line of the alignment system ensures proper trajectory to get into alignment at the charging coil.

FIG. 1c is a representation of a bus 16 approaching a wireless inductive charging station including wireless power induction coil 12 after completing a turn. It is important that the bus 16 be properly aligned at the wireless power induction coil 12, and proper turning radius and location is critical in achieving the correct trajectory. In this example, transmission line 14 has a length many tens of feet long and embedded in the roadway 17 with the proper orientation to consistently guide the bus 16 along the correct path for proper alignment at the charging coil 12.

Figure 2A:
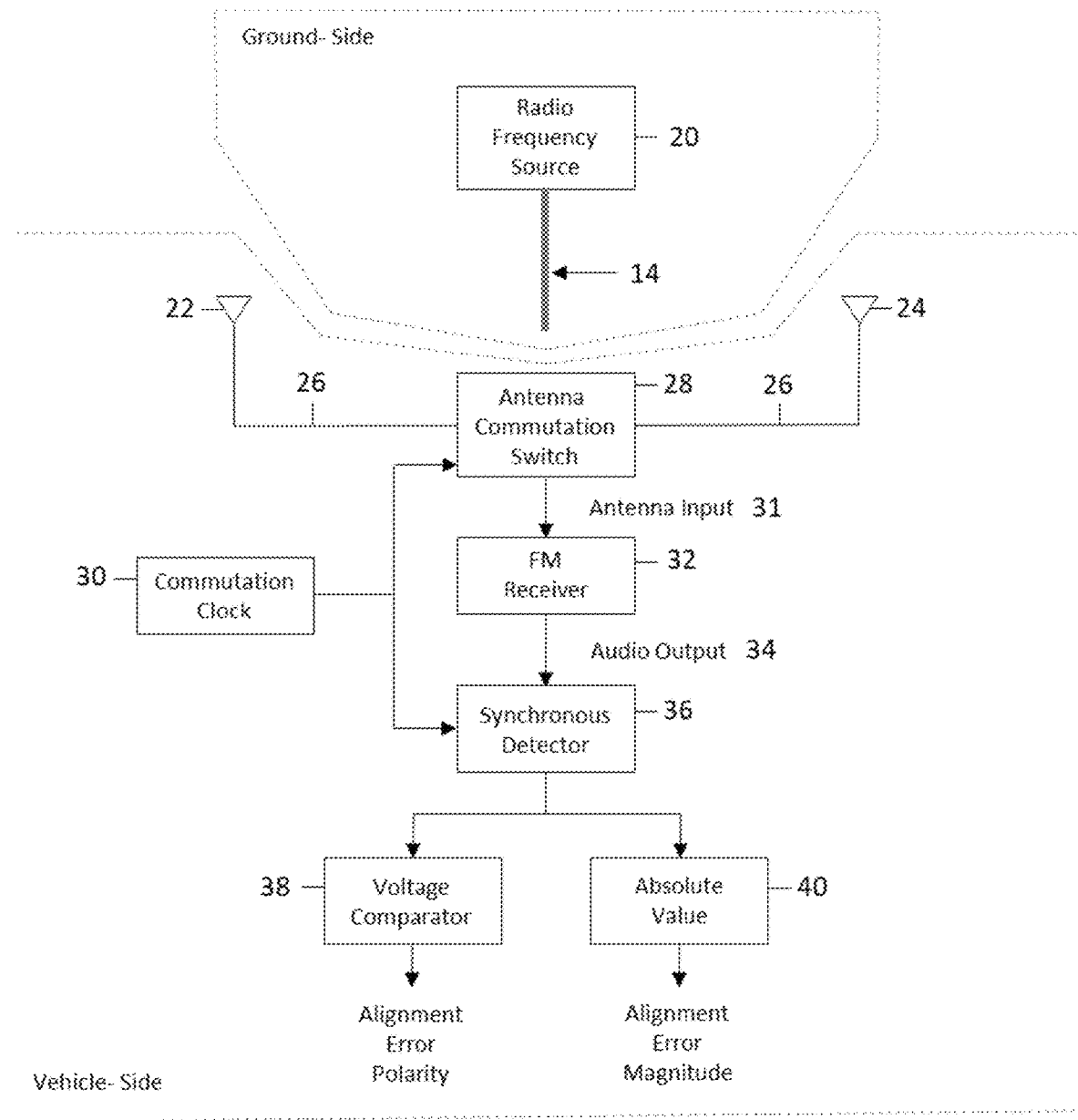
FIG. 2a shows a conceptual representation of the apparatus for vehicle parking alignment in accordance with a sample embodiment.

FIG. 2a is a block diagram representation of the alignment electronics. On the ground, there is a radio frequency source 20 and a length of transmission line 14. On the vehicle, there are two small antennas 22, 24 mounted equal distant to the left and the right of the vehicle centerline. Those skilled in the art will appreciate that the antenna 22, 24 could also be offset (not equidistant) provided the offset is accounted for in the detected phase offset. The antennas 22, 24 are connected by coaxial cable 26 to an antenna switch 28. The antenna switch 28 is controlled by the antenna commutation clock 30 to alternately connect one then the other antenna 22, 24 to a conventional frequency modulation radio receiver 32. In a sample embodiment, the commutation signal is a 50% duty cycle square wave.

When the two receiving antennas 22, 24 are placed equal distant from the transmission line 14 as is the case when the vehicle is symmetrically aligned within the parking slot 10 perimeter, the commutating action of the antenna switch 28 has no effect upon the receiver signal. The amplitude and the phase of the two antenna input signals 31 are identical and there is no response from the receiver 32. However, if the vehicle is mis-aligned within the parking slot 10, the vehicle antennas 22, 24 are no longer symmetrical with respect to the transmission line 14. The antenna switching action then introduces signal amplitude and phase perturbations at the commutation rate. The signal from the antenna closer to the transmission line 14 will have larger amplitude and leading phase with respect to the more distant antenna. The frequency modulation receiver 32 ignores the amplitude perturbations but detects the phase perturbations, frequency being the time rate of change of phase, thereby replicating the antenna switch commutation signal in the receiver audio output 34. The receiver audio commutation signal replica is altered by the limited receiver bandwidth. If the commutating signal frequency is above the receiver recovered audio pass band, there is no recovered commutation signal. If the commutating signal frequency is just above the lower receiver audio pass band frequency, the recovered commutation signal will approximate the original commutation square wave albeit low pass filtered by the receiver upper audio pass band limit. A commutation signal frequency in the upper half of the receiver audio pass band leads to a largely sinusoidal recovered audio signal.

As further illustrated in FIG. 2a, the audio output 34 is provided to synchronous detector 36 to detect the phase differences between the respective antenna signals, and output signals representative of any mis-alignments are provided to a voltage comparator 38 to determine alignment error polarity based on which signal has a leading phase or lagging phase and to an absolute value detector 40 that determines the alignment error magnitude. In sample embodiments, the alignment error polarity and alignment error magnitude signals are provided to a display device and other audiovisual means to provide feedback to the driver for adjusting the vehicle in the parking slot 10 with respect to the wireless power induction coil 12.

Figure 2B:
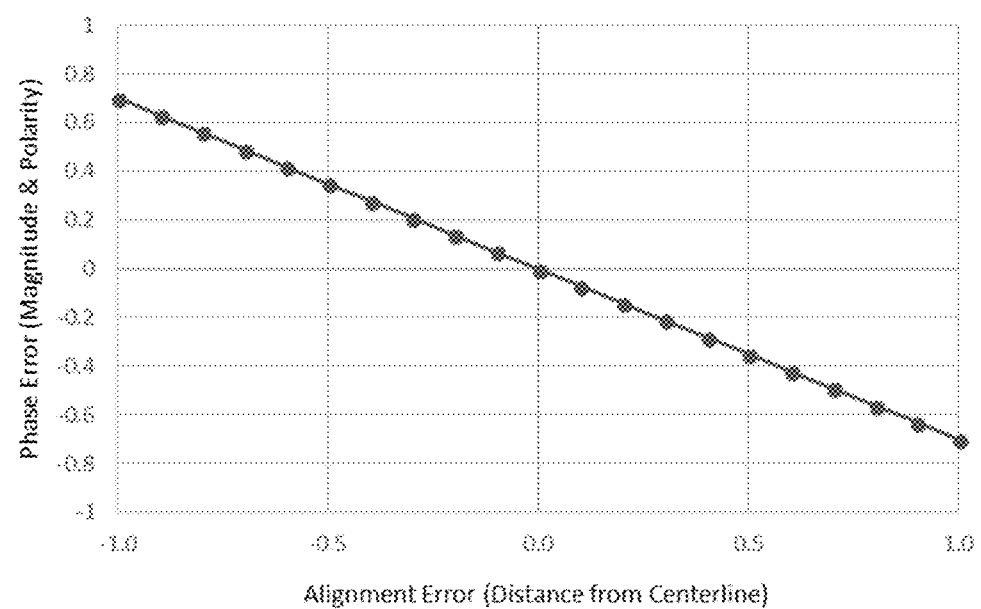
FIG. 2b shows a representative relationship between vehicle antenna phase difference and vehicle alignment.

FIG. 2b depicts an example representation of phase differences between the respective alignment antennas as a function of the alignment error or displacement from centerline.

The system maximum operating frequency provided by radio frequency source 20 is set by the separation between the two vehicle mounted antennas 22, 24 which must be less than the width of the vehicle. In the United States, the average parking slot width is about nine feet. Automobiles are typically no more than 8 feet wide. In order to avoid phase ambiguity, the two sensing antennas 22, 24 must be spaced no more than $\lambda/2$ apart at the operating frequency. For two sensing antennas separated by eight feet, the maximum system operating frequency is about 61.5 MHz. Higher frequencies and narrower antenna spacing is possible if the vehicle driver can be assumed to enter the parking slot with an initial alignment error less than ½ of the parking slot width. Higher operating frequencies are also possible with the use of more than two vehicle mounted antennas with the additional antenna or antennas used to resolve phase ambiguity. Those skilled in the art will appreciate that there is no lower limit on the system operating frequency except the signal to noise ratio of alignment error becomes progressively worse as the operating frequency is lowered.

The apparatus described herein provides for vehicle alignment left-right with respect to the parking slot centerline. Vehicle left-right mis-alignment is indicated to the driver by visible, audible or tactile means. A visual indication can be an illuminated indicator, a graphical display or software generated graphical overlay imposed upon a video camera image. An audible indication may be a continuous or pulsating sound or a software generated speech synthesizer. Tactile indication can be provided by the vehicle steering wheel or steering mechanism, gear shift lever, the driver's seat or through the vehicle floor or through floor mounted vehicle control pedals. Driver visual cues or technical means described, for example, in U.S. Provisional Patent Application No. 61/862,572, filed Aug. 6, 2013, may be used to indicate and control where the aligned vehicle should stop for axial coil alignment in the front-back directions for assurance that the driver pulls far enough into the parking slot 10 to align the magnetic coils for charging.

Figure 3A:
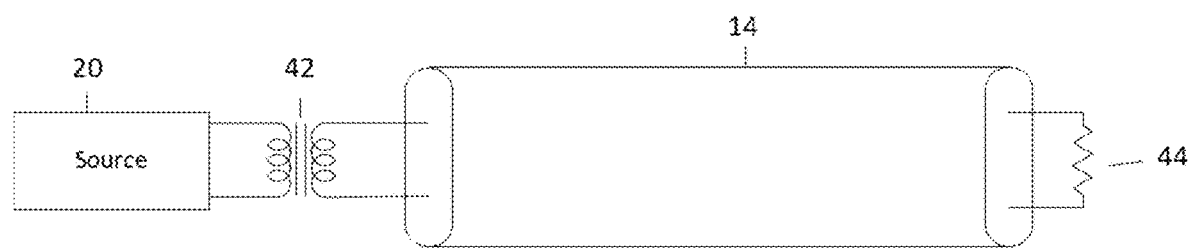
FIG. 3a shows an embodiment of the parking slot radio frequency source and transmission line implemented as a 300 Ohm balanced transmission line.
Figure 3B:
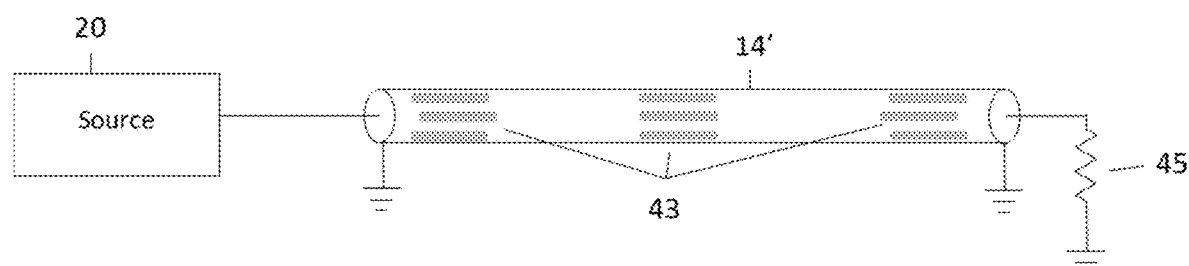
FIG. 3b shows an alternate embodiment of the parking slot radio frequency source and transmission line implemented as a terminated 50 or 75 Ohm coaxial cable with specially designed slots in the outer conductor or shield.

FIGS. 3a and 3b illustrate sample embodiments of the transmission line 14. In particular, FIG. 3a shows the radio frequency source 20 and a buried or surface mounted transmission line 14 that leaks a signal at the operating frequency. In this embodiment, a 40.68 MHz, fifty-ohm impedance continuous wave radio frequency source 20 provides radio frequency excitation. A power level of about 1 mW is used. A mini-circuits RF transformer 42, model number ADT 4-6T is used as an impedance matching balun. The transmission line 14 is implemented with a length of ordinary 300-ohm characteristic impedance balance transmission line. While this transmission line is not designed to be leaky, there is sufficient leakage to be picked up by antennas 22, 24 in sample embodiments. A 300-ohm resistor 44 terminates the end of the balance line in order to eliminate reflections and standing waves. The transmission line does not have to be balanced; a leaky un-balanced coaxial line would be equally suitable. Alternatively, other transmission line impedances such as 50 or 75-ohm coaxial cable with slots in the outer shielding could equally be used. FIG. 3b depicts an unbalanced 50 or 75 Ohm coaxial cable transmission line 14' with specially designed slots 43 and termination resistor 45 that is matched to the coaxial cable's characteristic impedance.

Figure 4:
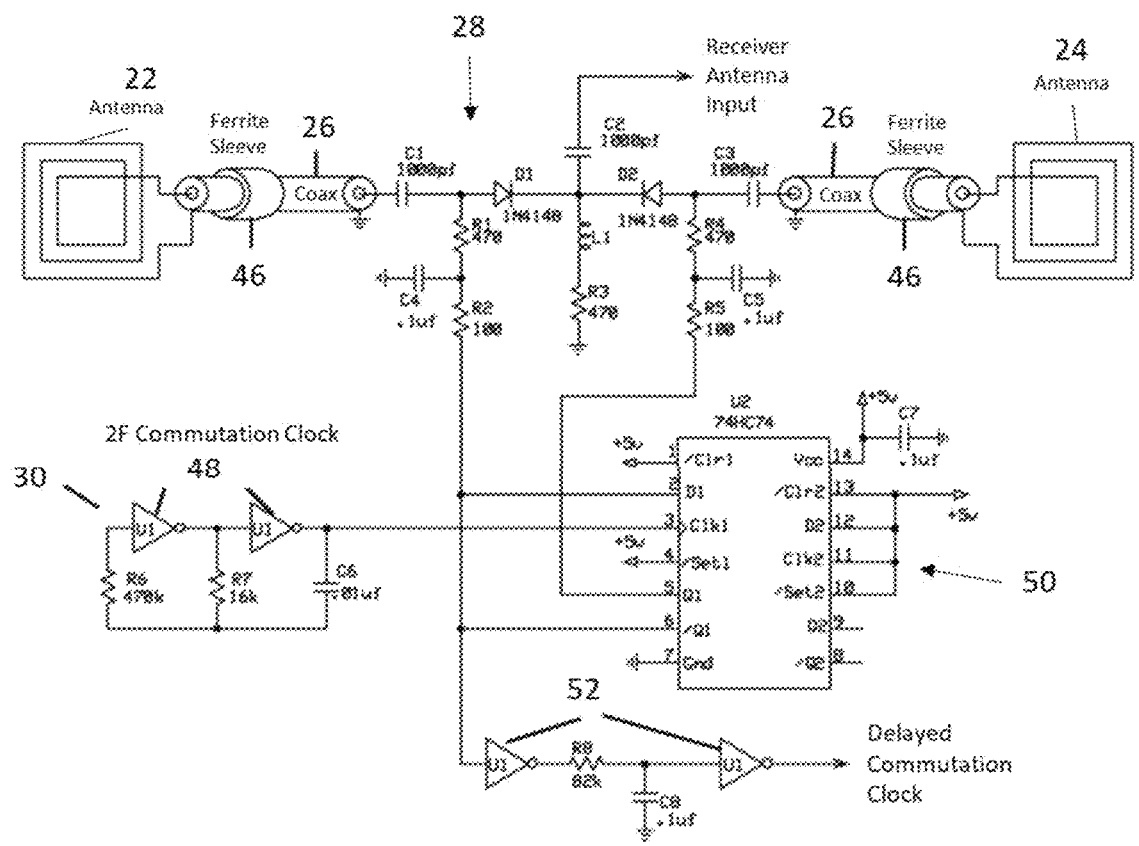
FIG. 4 shows an embodiment of the antenna commutation switch and associated circuitry.

FIG. 4 shows the circuitry associated with the antennas 22, 24, antenna commutating switch 28, and commutation clock 30 of FIG. 2. The antennas 22, 24 include rectangular spirals fabricated on a printed circuit board to ensure antenna-to-antenna consistency. The number of turns for the rectangular spirals depends on the desired value of inductance for the antenna that will be resonated with capacitance to achieve the desired response at the operating frequency. In a sample configuration, ten turn rectangular spirals were used for antennas 22, 24. The antennas 22, 24 are electrically small and are not resonant at the operating frequency without the employment of an additional capacitance. Each antenna 22, 24 is connected to a length of ordinary 50-ohm characteristic impedance coaxial cable 26. The two cables 26 are equal in length when the antennas are symmetrically spaced with respect to the centerline of the vehicle and each has a ferrite sleeve 46 including several ferrite beads slipped over the cable 26 at the ends connected to the antennas 22, 24 to serve as baluns and to suppress RF currents that would otherwise be induced on the cable outer conductors. Induced RF currents introduce significant system errors and must be suppressed. An operation frequency of 40.68 MHz is used in a sample embodiment. This frequency is near optimum for this application and is allocated nationally and internationally for ISM (Industrial, Scientific and Medical) uses which include RF heating, Doppler based frequency or phase sensitive motion and intrusion alarms, diathermy, cauterization and other non-communications uses. ISM frequencies are set aside for non-communications uses, but they can also be used for communications if the users are willing to accept the possibility of radio interference from the primary ISM applications. The advantage for doing so is significantly reduced equipment certification and spectrum allocation regulatory burdens. As the maximum range of the vehicle alignment system described herein is a few feet at most, the probability of radio interference from other 40.68 MHz ISM frequency users is quite remote.

An RC oscillator 30 comprised of two logic inverters 48, resistors R6 and R7 along with capacitor C6 generates a rectangular wave signal at twice the desired antenna commutation frequency which is then divided by 2 by a D flip-flop 50, thereby generating a commutation clock at the desired frequency with 50-50 duty cycle. Components R1, R3, R4, D1, D2, and L1 comprise a diode RF switch 28 controlled by the Q and not Q flip-flop outputs. R2, R5, C4, and C5 slow the leading and trailing edges of the switch control waveform thereby limiting switching transients. R8, C8 and associated logic inverters 52 delay the antenna commutation clock control signal to compensate for the receiver delay.

Figure 5:
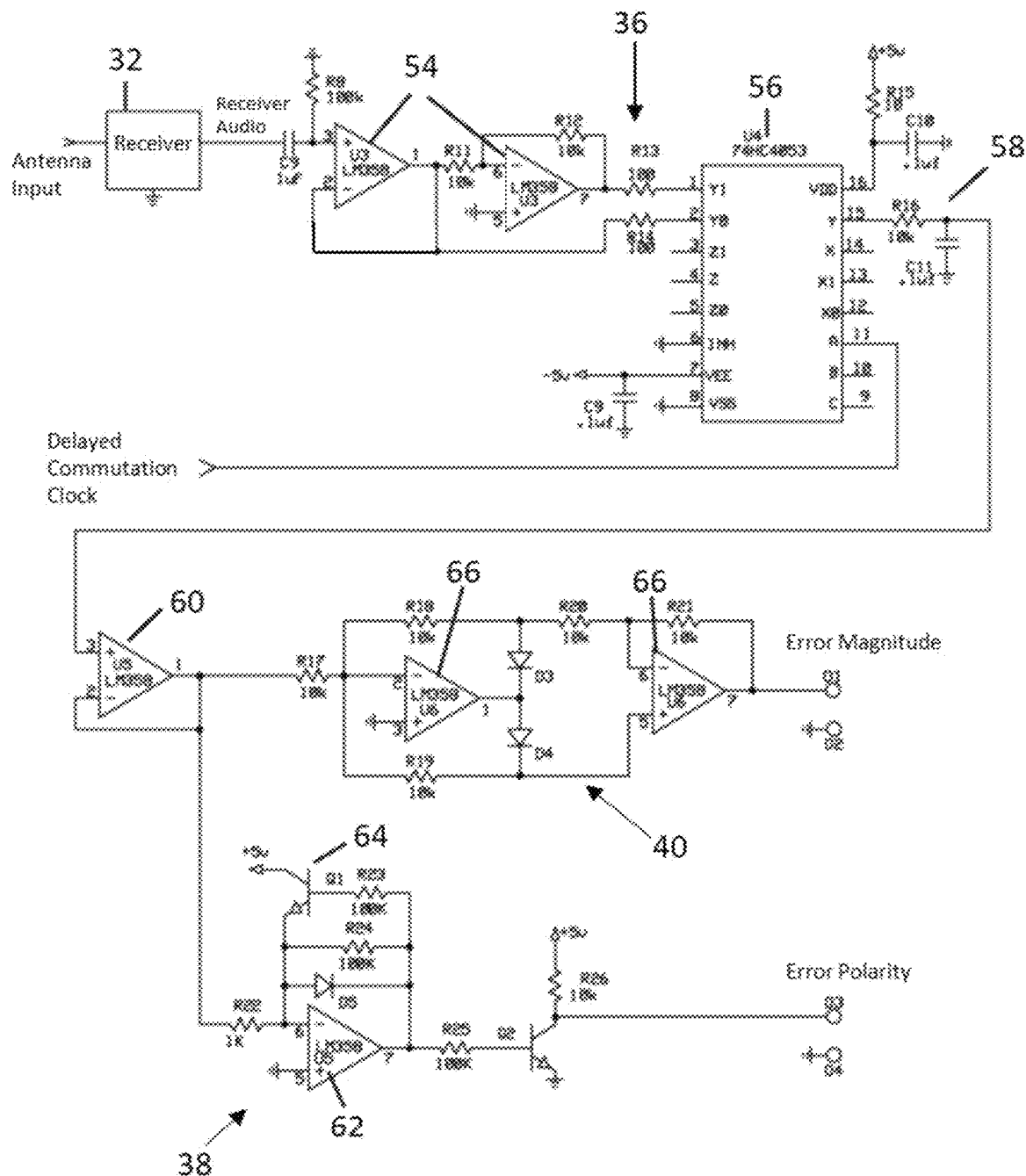
FIG. 5 shows an embodiment of the post FM receiver signal processing circuitry.

FIG. 5 shows the post receiver signal processing circuitry. The output of the antenna commutation switch 28 goes to the antenna input of a conventional narrowband FM receiver 32.

The circuit includes a consumer grade pocket sized scanning receiver, a Uniden BC72XLY compact scanner, but any narrowband VHF FM receiver implementation, analog or digital, hardware or software is acceptable. Vehicle alignment error appears in the receiver audio output as a bandwidth limited square wave at the antenna commutation clock frequency. Square wave magnitude indicates alignment error magnitude; square wave polarity indicates alignment error direction, left or right. Synchronous detection then produces a DC voltage with amplitude proportional to alignment error and with polarity indicating alignment error direction.

The two op-amps 54 amplify the audio signal from the FM receiver by gains of one and minus one. Integrated circuit 56 contains three single-pole double throw (SPDT) CMOS FET switches one of which is used as a synchronous rectifier driven by the delayed antenna commutation switch control signal. A low pass filter 58 comprised of resistor R16 and capacitor C1 I follows the SPDT switch 56 removing all commutation frequency ripples leaving a direct current signal with amplitude proportional to vehicle misalignment and polarity determined by the direction of the vehicle alignment error, left or right of the parking slot centerline. An absolute magnitude circuit recovers the magnitude of the vehicle displacement error while a voltage comparator determines the error polarity.

The two op-amps 60, 62 are used as a post RC low pass filter buffer amplifier and as a zero-reference voltage comparator, respectively. The components associated with transistor 64 keep the op-amp section out of voltage saturation thereby avoiding the subtle problems sometimes experienced when using op-amps in an open-loop connection as voltage comparators. The voltage comparator 38, implemented by op-amp 62, provides a logic level signal that indicates the polarity of the alignment error, left or right. Op-amps 66 and associated components comprise an absolute value detector 40 providing a unipolar representation of the alignment error magnitude independent of the polarity of the post synchronous detector signal.

In the implementation described above, the vehicle dual sense antennas 22, 24 and the transmission line 14 are mounted along the vehicle centerline and parking slot center line, respectively. Offset locations as might be required to avoid vehicle underbody and parking slot obstacles can be accommodated by including the appropriate offset correction in the post synchronous detector hardware or software. In the latter situation, the required offset correction is provided by the ground to vehicle communications link.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

We claim:

1. A vehicle alignment system for aligning a vehicle with a wireless power induction coil in a parking slot for wireless charging through use of magnetic resonant induction, comprising:
   a transmission line disposed in the parking slot so as to guide the vehicle to the wireless power induction coil for charging, the transmission line leaking a signal having an operating frequency;
   at least two vehicle mounted antennas mounted on opposite sides of the transmission line when the vehicle is aligned in the parking slot, said antennas detecting said signal having said operating frequency that leaks from the transmission line; and
   signal processing circuitry that detects a relative signal phase between signals detected by the antennas on opposite sides of the transmission line,
   wherein relative phase differences between the detected signals from the antennas are representative of alignment of the vehicle left-right with respect to the transmission line.

2. A system as in claim 1, wherein the transmission line is disposed along a centerline of the parking slot.

3. A system as in claim 2, wherein the vehicle mounted antennas are offset symmetrically from a centerline of the vehicle.

4. A system as in claim 1, wherein the transmission line is parallel to but offset from a center line of the parking slot.

5. A system as in claim 1, wherein the transmission line is curved along a trajectory to guide the vehicle to the wireless power induction coil in the parking slot.

6. A system as in claim 5, wherein the vehicle mounted antennas are offset symmetrically from a centerline of the vehicle.

7. A system as in claim 1, wherein the operating frequency is below 61.5 MHz.

8. A system as in claim 7, wherein the operating frequency is 40.68 MHz.

9. A system as in claim 7, wherein the operating frequency is 13.56 MHz.

10. A system as in claim 1, wherein the signal processing circuitry includes an antenna switch that switches between two or more vehicle mounted antennas.

11. A system as in claim 1, wherein the signal processing circuitry detects a relative signal phase between signals detected by the antennas on opposite sides of the transmission line and determines alignment error polarity and alignment error magnitude when the antennas are not equidistant from the transmission line.

12. A system as in claim 11, further comprising visible, audible, or tactile means for directing a driver to adjust alignment of the vehicle relative to the transmission line in response to said alignment error polarity and said alignment error magnitude.

13. A system as in claim 1, further comprising a continuous wave radio frequency source that provides radio frequency excitation to the transmission line at a power level of about 1 mW.

14. A system as in claim 13, wherein the transmission line comprises a 300-ohm characteristic impedance transmission line.

15. A system as in claim 13, wherein the transmission line comprises a 50 or 75-ohm coaxial cable with slots in outer shielding of the coaxial cable and a termination resistor that is matched to a characteristic impedance of the coaxial cable.

16. A system as in claim 1, wherein the signal processing circuitry comprises:
   a frequency modulation receiver for detection of the relative phase differences between the signals detected by the respective antennas, said phase differences induced by sequential switching when the antennas are not an equal distance from the transmission line,
   a synchronous detector responsive to antenna switching frequency components present in the output of said frequency modulation receiver, a voltage comparator that determines alignment error polarity from an output of said synchronous detector, and an absolute value circuit that determines alignment error magnitude from said output of said synchronous detector.

17. A method for aligning a vehicle with a wireless power induction coil in a parking slot for wireless charging through use of magnetic resonant induction, comprising:
- a transmission line disposed in the parking slot leaking a signal having an operating frequency, said transmission line disposed in the parking slot so as to guide the vehicle to the wireless power induction coil for charging;
- aligning the vehicle left-right in the parking slot relative to the transmission line for charging by the wireless power induction coil, the aligning comprising at least two vehicle mounted antennas mounted on opposite sides of the transmission line when the vehicle is aligned in the parking slot detecting said signal having said operating frequency that leaks from the transmission line; and
- adjusting alignment of the vehicle relative to the wireless power induction coil based on relative phase differences between the detected signals from the antennas as representative of alignment of the vehicle left-right with respect to the transmission line.

18. A method as in claim 17, comprising disposing the transmission line along a curved trajectory to guide the vehicle to the wireless power induction coil in the parking slot.

19. A method as in claim 17, wherein the transmission line leaks the signal through slots in outer shielding of a 50 or 75-ohm coaxial cable.

20. A method as in claim 17, wherein the leaked signal has an operating frequency of 13.56 MHz.

21. A method as in claim 17, wherein the aligning comprises:
- a frequency modulation receiver detecting a relative signal phase between signals detected by the antennas on opposite sides of the transmission line, said phase differences induced by sequential switching when the antennas are not an equal distance from the transmission line, wherein said sequential switching includes a synchronous detector responsive to antenna switching frequency components present in the output of said frequency modulation receiver switching between the antennas,
- a voltage comparator determining alignment error polarity from an output of said synchronous detector, and
- an absolute value circuit determining alignment error magnitude from said output of said synchronous detector.

* * * * *